United States Patent
Ikarashi et al.

(10) Patent No.: US 11,888,977 B2
(45) Date of Patent: Jan. 30, 2024

(54) SHARE GENERATING DEVICE, SHARE CONVERTING DEVICE, SECURE COMPUTATION SYSTEM, SHARE GENERATION METHOD, SHARE CONVERSION METHOD, PROGRAM, AND RECORDING MEDIUM

(71) Applicant: NIPPON TELEGRAPH AND TELEPHONE CORPORATION, Chiyoda-ku (JP)

(72) Inventors: Dai Ikarashi, Musashino (JP); Ryo Kikuchi, Musashino (JP); Koji Chida, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 17/742,632

(22) Filed: May 12, 2022

(65) Prior Publication Data

US 2022/0278829 A1    Sep. 1, 2022

Related U.S. Application Data

(62) Division of application No. 16/640,092, filed as application No. PCT/JP2018/030439 on Aug. 16, 2018, now Pat. No. 11,374,743.

(30) Foreign Application Priority Data

Aug. 22, 2017   (JP) .................................. 2017-159345

(51) Int. Cl.
   *H04L 9/08*    (2006.01)

(52) U.S. Cl.
   CPC ............ *H04L 9/085* (2013.01); *H04L 9/0819* (2013.01); *H04L 9/0869* (2013.01)

(58) Field of Classification Search
   CPC ... H04L 9/0852; H04L 9/0858; H04L 9/0855; H04L 63/061; H04L 9/083; H04L 9/0822;
   (Continued)

(56) References Cited

U.S. PATENT DOCUMENTS

| | | | | |
|---|---|---|---|---|
| 809 | A * | 6/1838 | Walkly ................... | H02K 25/00 310/46 |
| 916 | A * | 9/1838 | Guyon ................... | B62B 19/02 280/13 |

(Continued)

FOREIGN PATENT DOCUMENTS

| | | |
|---|---|---|
| CN | 104429019 A | 3/2015 |
| EP | 2 879 324 A1 | 6/2015 |

(Continued)

OTHER PUBLICATIONS

Shamir, A. "How to Share a Secret", Communications of the ACM, Nov. 1979, vol. 22, No. 11, pp. 612-613.

(Continued)

*Primary Examiner* — Sharif E Ullah
(74) *Attorney, Agent, or Firm* — Oblon, McClelland, Maier & Neustadt, L.L.P.

(57) ABSTRACT

A share generating device obtains N seeds $s_0, \ldots, s_{N-1}$, obtains a function value $y=g(x, e) \in F^m$ of plaintext $x \in F^m$ and a function value $e$, and obtains information containing a member $y_i$ and N−1 seeds $s_d$, where $d \in \{0, \ldots, N-1\}$ and $d \neq i$, as a share $SS_i$ of the plaintext $x$ in secret sharing and outputs the share $SS_i$. It is to be noted that the function value $y$ is expressed by members $y_0 \in F^{m(0)}, \ldots, y_{N-1} \in F^{m(N-1)}$ which satisfy $m = m(0) + \ldots + m(N-1)$.

6 Claims, 5 Drawing Sheets

(58) Field of Classification Search
CPC ....... H04L 9/3226; H04L 9/0891; H04L 9/14; H04L 9/0827; H04L 2209/24; H04L 9/08; H04L 9/0819; H04L 9/088; H04L 9/085; H04L 9/0869; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86
USPC ........ 713/150, 163, 168, 181; 726/2, 21, 36; 380/255, 264, 276

See application file for complete search history.

(56) References Cited

U.S. PATENT DOCUMENTS

| | | | | |
|---|---|---|---|---|
| 12,014 A * | 11/1854 | Boynton | ............... | D05B 29/06 112/151 |
| 12,019 A * | 12/1854 | Clark | ................... | F22B 37/428 236/103 |
| 32,007 A * | 4/1861 | Shaw | ..................... | D05B 73/12 192/41 R |
| 32,014 A * | 4/1861 | Taylor | .................... | A61F 5/028 602/19 |
| 32,020 A * | 4/1861 | Willmot | .................... | E05F 5/06 16/86 A |
| 52,018 A * | 1/1866 | Blinn | ....................... | E06B 9/24 160/133 |
| 61,998 A * | 2/1867 | Bushman | ................. | A63C 1/30 280/11.12 |
| 62,004 A * | 2/1867 | Children | ............... | A01B 35/08 172/333 |
| 62,005 A * | 2/1867 | Clark | ........................ | F23H 9/00 126/171 |
| 62,018 A * | 2/1867 | De La Mar | ............. | A42C 1/04 223/13 |
| 72,017 A * | 12/1867 | Gleason | ................. | B29C 33/62 264/130 |
| 82,011 A * | 9/1868 | Lindsley | ................... | B07B 1/46 209/315 |
| 82,016 A * | 9/1868 | McFarland et al. | ...... | E05G 1/14 109/29 |
| 82,017 A * | 9/1868 | McNeil | .................... | B21D 1/06 72/482.94 |
| 102,014 A * | 4/1870 | Kennedy | ................. | A46B 15/00 15/105 |
| 5,764,765 A * | 6/1998 | Phoenix | ............... | H04L 9/0858 380/256 |
| 6,748,083 B2 * | 6/2004 | Hughes | ............... | H04L 9/0858 380/278 |
| 7,437,081 B2 * | 10/2008 | Mitchell | ............... | H04B 10/70 398/154 |
| 7,995,765 B2 * | 8/2011 | Schneider | ............... | H04L 9/085 380/278 |
| 8,855,316 B2 * | 10/2014 | Wiseman | ............. | H04L 9/0855 380/278 |
| 9,960,465 B2 * | 5/2018 | Dudley | ............... | H01M 50/204 |
| 10,057,058 B2 * | 8/2018 | Murakami | ........... | H04L 9/0858 |
| 2004/0179686 A1 | 9/2004 | Matsumura et al. | | |
| 2005/0138352 A1 * | 6/2005 | Gauvreau | .............. | H04L 9/3247 713/153 |
| 2007/0065154 A1 * | 3/2007 | Luo | ..................... | H04J 14/0282 398/141 |
| 2007/0076884 A1 * | 4/2007 | Wellbrock | ............ | H04L 9/0855 380/263 |
| 2007/0195774 A1 * | 8/2007 | Sherman | ................. | H04L 69/16 370/392 |
| 2010/0046739 A1 * | 2/2010 | Schneider | ............... | H04L 9/085 380/28 |
| 2011/0206204 A1 * | 8/2011 | Sychev | ............... | H04J 14/0273 380/256 |
| 2011/0213979 A1 * | 9/2011 | Wiseman | .............. | H04L 9/0844 713/171 |
| 2014/0010234 A1 * | 1/2014 | Patel | ....................... | H04L 45/74 370/392 |
| 2014/0068765 A1 * | 3/2014 | Choi | ................... | H04L 63/1416 726/23 |
| 2014/0133652 A1 * | 5/2014 | Oshida | .................. | H04L 9/0897 380/255 |
| 2016/0241396 A1 * | 8/2016 | Fu | .......................... | H04L 9/0836 |
| 2016/0359626 A1 * | 12/2016 | Fu | .......................... | H04L 9/0858 |
| 2016/0366094 A1 * | 12/2016 | Mason | ................. | H04L 61/5038 |
| 2017/0214525 A1 * | 7/2017 | Zhao | ................. | H04W 12/0431 |
| 2017/0230173 A1 * | 8/2017 | Choi | ......................... | H04L 9/12 |
| 2018/0176091 A1 * | 6/2018 | Yoon | .................... | H04L 43/0888 |
| 2019/0036821 A1 * | 1/2019 | Levy | .................. | G06F 12/0868 |
| 2019/0349392 A1 * | 11/2019 | Wetterwald | ......... | H04L 43/0852 |
| 2020/0084222 A1 * | 3/2020 | William | ................ | H04L 9/3242 |

FOREIGN PATENT DOCUMENTS

| | | |
|---|---|---|
| EP | 3 258 458 A1 | 12/2017 |
| JP | 2016-178550 A | 10/2015 |
| WO | WO 2016/147718 A1 | 9/2016 |

OTHER PUBLICATIONS

Cramer, R. et al., "Share Conversion, Pseudorandom Secret-Sharing and Applications to Secure Computation", TCC, 2005, pp. 342-362.

Ben-Or, M. et al., "Completeness Theorems for Non-Cryptographic Fault-Tolerant Distributed Computation (Extended Abstract)", STOC, 1988, pp. 1-10.

International Search Report dated Nov. 13, 2018 in PCT/JP2018/030439 filed on Aug. 16, 2018, 1 page.

* cited by examiner

SHARE GENERATING DEVICE, SHARE CONVERTING DEVICE, SECURE COMPUTATION SYSTEM, SHARE GENERATION METHOD, SHARE CONVERSION METHOD, PROGRAM, AND RECORDING MEDIUM

CROSS-REFERENCE TO RELATED APPLICATIONS

This application is a division of and claims the benefit of priority under 35 U.S.C. § 120 from U.S. application Ser. No. 16/640,092 filed Feb. 19, 2020, the entire contents of which are incorporated herein by reference. U.S. application Ser. No. 16/640,092 is a National Stage of PCT/JP2018/030439 filed Aug. 16, 2018, which claims the benefit of priority under 35 U.S.C. § 119 from Japanese Application No. 2017-159345 filed Aug. 22, 2017.

TECHNICAL FIELD

The present invention relates to cryptographic technologies and, in particular, relates to a secure computation technique.

BACKGROUND ART

One of secret sharing schemes is Shamir's secret sharing scheme (see, for example, Non-patent Literature 1 and so forth).

PRIOR ART LITERATURE

[Non-Patent Literature]
Non-patent Literature 1: A. Shamir, "How to Share a Secret", Communications of the ACM, November 1979, Volume 22, Number 11, pp. 612-613.

SUMMARY OF THE INVENTION

Problems to Be Solved By the Invention

Secure computation devices can perform secure computation using shares obtained in accordance with Shamir's secret sharing scheme without changing them. However, when these shares are distributed among N secure computation devices in accordance with the secret sharing scheme, the total amount of data of the shares is N orders of magnitude larger than the amount of data of plaintext. Thus, if these shares are transmitted to the N secure computation devices without being changed, the total amount of communication data is also N orders of magnitude larger than the amount of data of the plaintext.

An object of the present invention is to provide a technique for generating shares whose total amount of communication data is smaller than that of shares in accordance with Shamir's secret sharing scheme and which can be converted into shares in accordance with Shamir's secret sharing scheme or a technique for converting shares, whose total amount of communication data is smaller than that of shares in accordance with Shamir's secret sharing scheme, into shares in accordance with Shamir's secret sharing scheme.

Means to Solve the Problems

A share generating device obtains N seeds $s_0, \ldots, s_{N-1}$, obtains a function value $y=g(x, e) \in F^m$ of plaintext $x \in F^m$ and a function value e, and obtains information containing a member $y_i \in F^{m(i)}$ and N−1 seeds $s_d$, where $d \in \{0, \ldots, N-1\}$ and $d \neq i$, as a share $SS_i$ of the plaintext x in secret sharing and outputs the share $SS_i$. It is to be noted that N is an integer greater than or equal to 2, in is an integer greater than or equal to 1, m(i) is an integer greater than or equal to 0, $i=0, \ldots, N-1$ holds, P is a function, the range of the function P belongs to a set $F^m$ whose members are sequences of in elements of field F, $P(s_0), \ldots, P(s_{N-1}) \in F^m$ are function values of the seeds $s_0, \ldots, s_{N-1}$, $e=f(P(s_0), \ldots, P(s_{N-1})) \in F^m$ is a function value of the function values $P(s_0), \ldots, P(s_{N-1}) \in F^m$, and the function value y is expressed by members $y_0 \in F^{m(0)}, \ldots, y_{N-1} \in F^{m(N-1)}$ which satisfy $m=m(0)+ \ldots +m(N-1)$.

Each share converting device $A_i$ included in N share converting devices $A_0, \ldots, A_{N-1}$ accepts a share $SS_i$, possesses an arbitrary value $t_i \in F^{m(i)}$ jointly with another share converting device $A_{i-1 \mod N}$, obtains a share $[y_i]_u \in F^{m(i)}$ of each share converting device $A_u$ by secret-sharing a member $y_i$ in accordance with Shamir's secret sharing scheme on the assumption that the arbitrary value $t_i$ is a share $[y_i]_{i-1 \mod N}$ of the share converting device $A_{i-1 \mod N}$ and outputs the share $[y_i]_u$, accepts shares $[y_d]_i$, obtains function values $P(s_d) \in F^m$ of seeds $s_d$, converts a set $SET_i$ of the function values $P(s_d)$, where $d \in \{0, \ldots, N-1\}$ and $d \neq i$, which is a share of a function value $e=f(P(s_0), \ldots, P(s_{N-1})) \in F^m$ with respect to function values $P(s_0), \ldots, P(s_{N-1})$ of N seeds $s_0, \ldots, s_{N-1}$, into a share $[e]_i$ of the function value e in accordance with Shamir's secret sharing scheme, and obtains a share $[x]_i$ of $x=g^{-1}(y, e)$ in accordance with Shamir's secret sharing scheme by secure computation using a share $[y]_i$, which is expressed by shares $[y_0]_i, \ldots, [y_{N-1}]_i$, and the share $[e]_i$. It is to be noted that $u=0, \ldots, N-1$ holds and the share $[y]_i$ is a share of a function value $y=g(x, e) \in F^m$ with respect to plaintext x and the function value e.

Effects of the Invention

A share generating device can generate shares whose total amount of communication data is smaller than that of shares in accordance with Shamir's secret sharing scheme and which can be converted into shares in accordance with Shamir's secret sharing scheme. A share converting device can convert shares, whose total amount of communication data is smaller than that of shares in accordance with Shamir's secret sharing scheme, into shares in accordance with Shamir's secret sharing scheme.

DETAILED DESCRIPTION OF THE EMBODIMENTS

Hereinafter, embodiments of the present invention will be described with reference to the drawings.

First Embodiment

First, a first embodiment will be described.
<Configuration>

Figure 1:
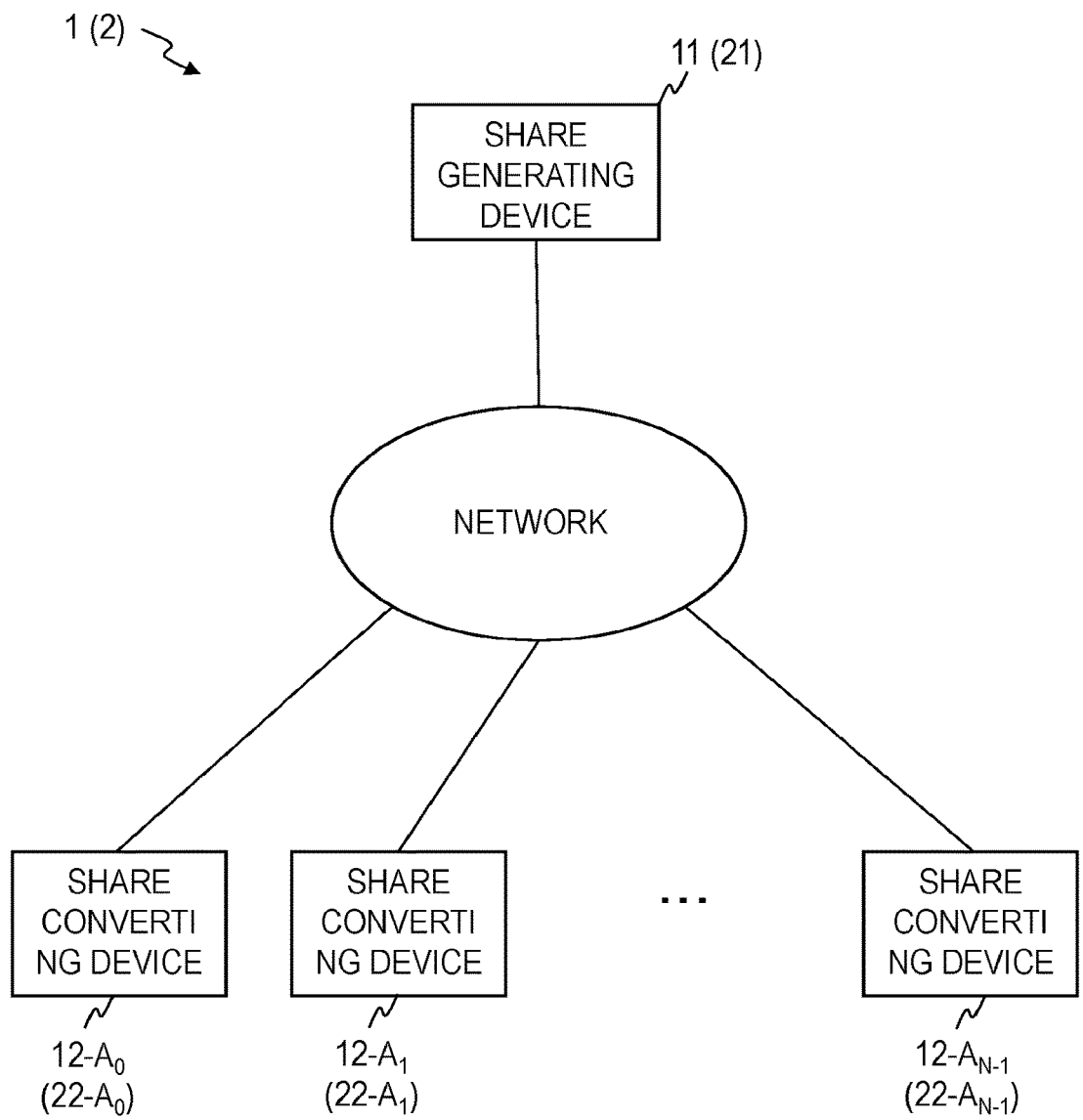
FIG. 1 is a block diagram illustrating the configuration of a secure computation system of an embodiment.

As illustrated in FIG. 1, a secure computation system 1 of the present embodiment includes a share generating device 11 and N share converting devices 12-$A_0$, ..., 12-$A_{N-1}$, and these devices can communicate with one another through a network such as the Internet. It is to be noted that N is an integer greater than or equal to 2. For example, N is an integer greater than or equal to 3. One example of N is N=3. Although FIG. 1 illustrates one share generating device 11, the secure computation system 1 may include a plurality of share generating devices.

Figure 2:
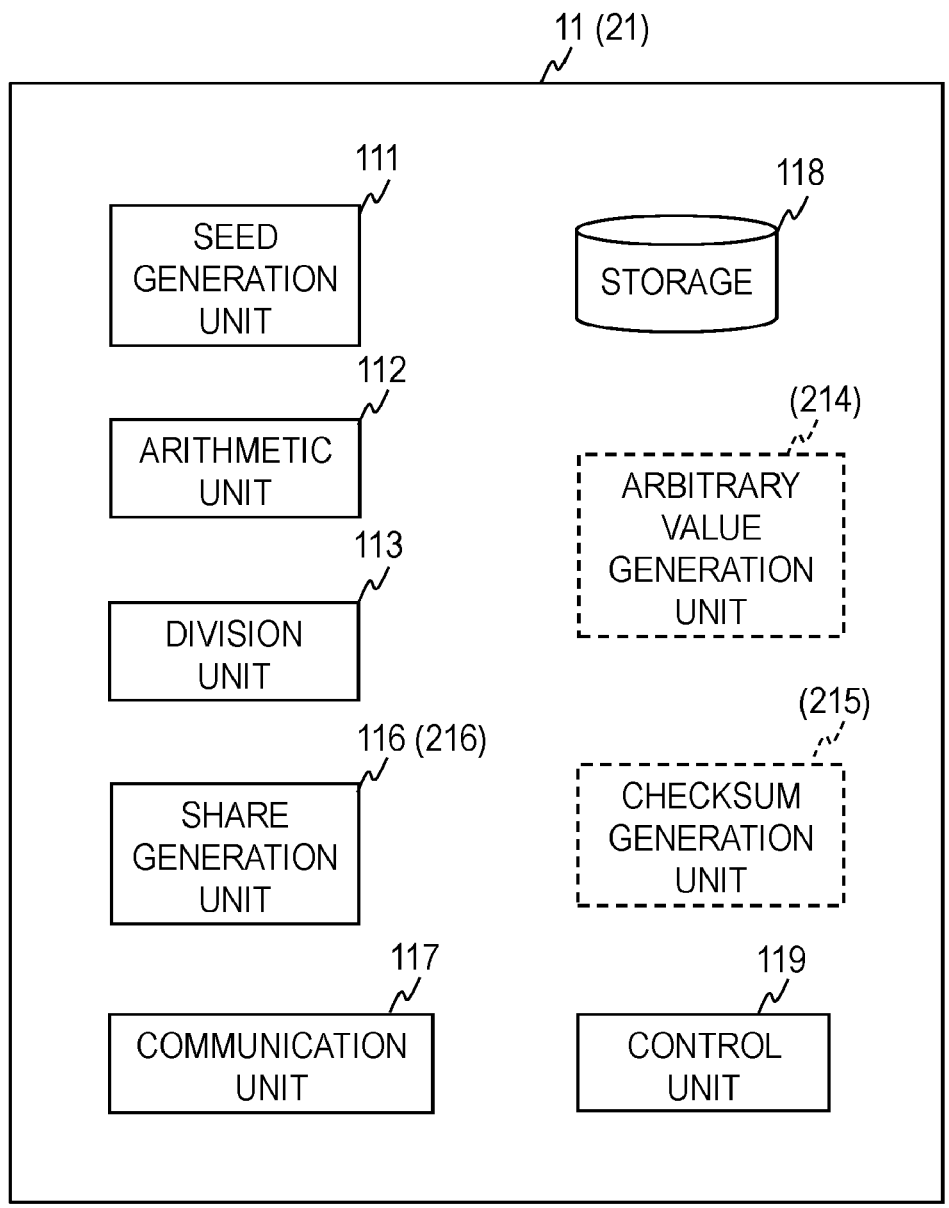
FIG. 2 is a block diagram illustrating the functional configuration of a share generating device of the embodiment.

As illustrated in FIG. 2, the share generating device 11 of the present embodiment includes a seed generation unit 111, an arithmetic unit 112, a division unit 113, a share generation unit 116, a communication unit 117, a storage 118, and a control unit 119 and executes each processing under control of the control unit 119. Information output from each processing unit (a part that performs processing) of the share generating device 11 is stored in the storage 118 and is read therefrom when necessary and input to another processing unit.

Figure 3:
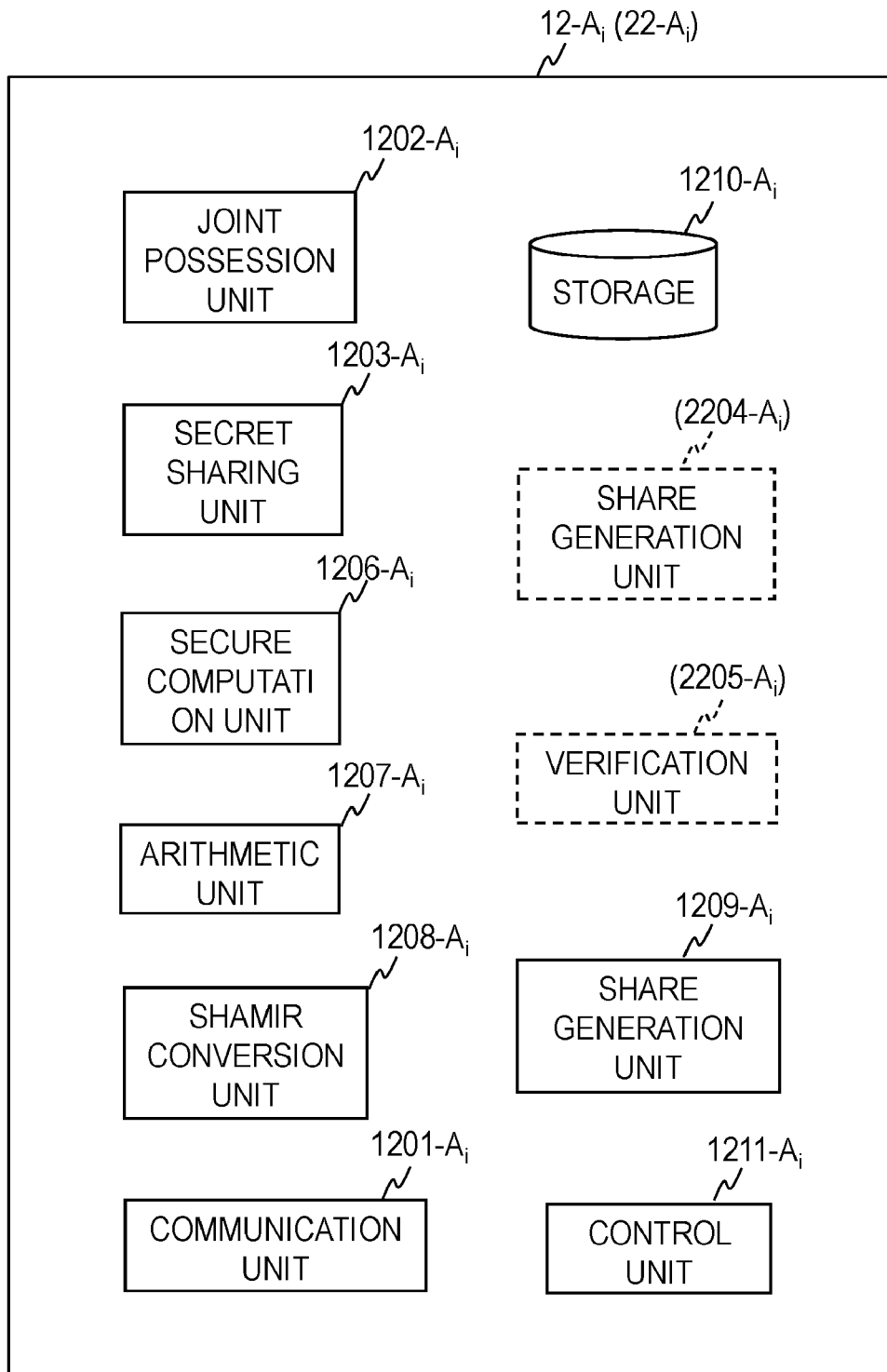
FIG. 3 is a block diagram illustrating the functional configuration of a share converting device of the embodiment.

As illustrated in FIG. 3, each share converting device 12-$A_i$ (i=0, ..., N−1) includes a communication unit 1201-$A_i$, a joint possession unit 1202-$A_i$, a secret sharing unit 1203-$A_i$, a secure computation unit 1206-$A_i$, an arithmetic unit 1207-$A_i$, a Shamir conversion unit 1208-$A_i$, a share generation unit 1209-$A_i$, a storage 1210-$A_i$, and a control unit 1211-$A_i$ and executes each processing under control of the control unit 1211-$A_i$. Information output from each processing unit of the share converting device 12-$A_i$ is stored in the storage 1210-$A_i$ and is read therefrom when necessary and input to another processing unit.

<Share Generation Method>

Figure 4:
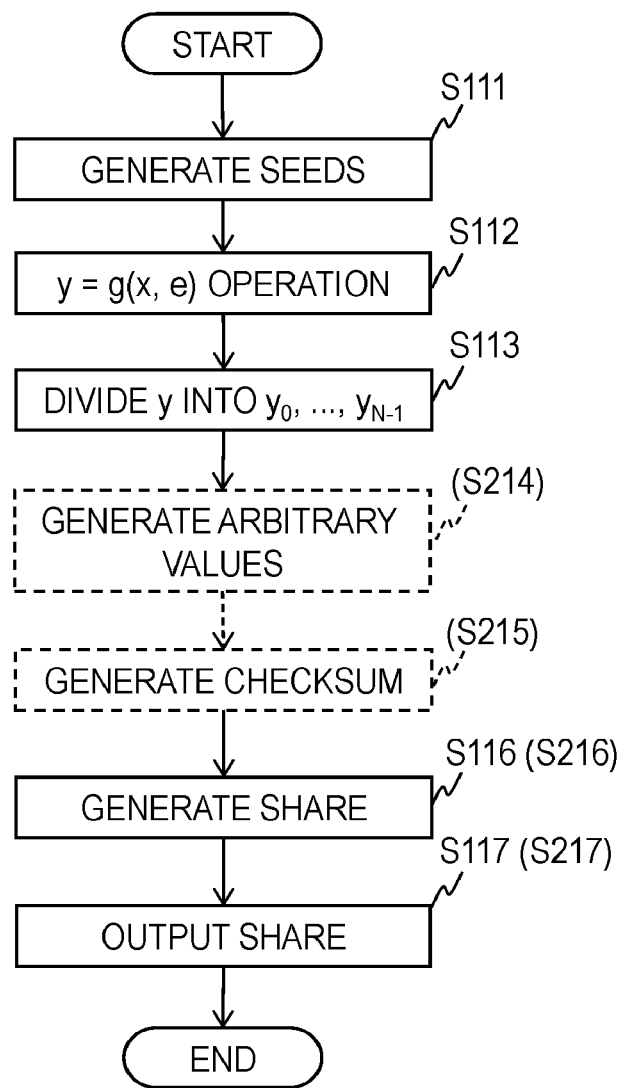
FIG. 4 is a flow diagram for explaining a share generation method of the embodiment.

A share generation method which is performed by the share generating device 11 of the present embodiment will be described using FIG. 4. It is to be noted that a "share" means a fragment in secret sharing.

First, the seed generation unit 111 (FIG. 2) obtains N seeds $s_0, \ldots, s_{N-1}$ and outputs the N seeds $s_0, \ldots, s_{N-1}$. There is no limitation on the data format of the seeds $s_0, \ldots, s_{N-1}$, and any values can be used as the seeds $s_0, \ldots, s_{N-1}$. One example of the seeds $s_0, \ldots, s_{N-1}$ is elements of a set $F^w$ whose members are sequences of w elements of field F ($s_0, \ldots, s_{N-1} \in F^w$). It is to be noted that $\alpha \in \beta$ means that $\alpha$ is a member of $\beta$. w is an integer greater than or equal to 1. If w=1, $F^w$ is a field F. An example of the field F is a set of remainders modulo a prime number p ($\alpha$ mod p, where $\alpha$ is any number), and the operation result in the field F in this case is obtained as a remainder modulo a prime number p. $p \geq 3$ holds and, for instance, $p=2^{61}-1$ holds. A seed $s_i$ (i=0, ..., N−1) may be an arbitrary value or an output value obtained by other processing. The "arbitrary value" may be a random number (a pseudo random number or a true random number), a value selected from a plurality of preset values, or a value obtained by other processing. For example, the seed generation unit 111 generates N random numbers and outputs them as the seeds $s_0, \ldots, s_{N-1}$ (Step S111).

Plaintext $x \in F^m$ to be secret-shared and the seeds $s_0, \ldots, s_{N-1}$ output from the seed generation unit 111 are input to the arithmetic unit 112. It is to be noted that m is an integer greater than or equal to 1. For instance, m is an integer greater than or equal to 2 or an integer greater than or equal to 3. The arithmetic unit 112 obtains a function value $y=g(x, e) \in F^m$ of the plaintext $x \in F^m$ and a function value $e=f(P(s_0), \ldots, P(s_{N-1})) \in F^m$ and outputs the function value y. It is to be noted that P is a function. The range of the function P belongs to a set $F^m$ whose members are sequences of in elements of field F. One example of the set $F^m$ is a set of m-dimensional vectors, whose members are in elements of field F. The domain of definition of the function P may be any domain of definition; for example, the domain of definition of the function P belongs to the set $F^w$. For instance, w<m holds. An example of the function P is a pseudo random number generating function. $P(s_0), \ldots, P(s_{N-1}) \in F^m$ are function values (for example, pseudo random numbers) of the seeds $s_0, \ldots, s_{N-1}$. $g: F^{m \times 2} \to F^m$ is a linear function (a function with linearity) that maps elements of two sets $F^m$ to elements of one set $F^m$. For example, $y=x-e \in F^m$ holds. However, this does not limit the present invention. For instance, a value which is obtained by an operation expressed by a formula obtained by multiplying part or all of the terms of x−e by a constant may be used as y, a value which is obtained by an operation expressed by a formula obtained by replacing part or all of the terms of x−e with an inverse element may be used as y, a value which is obtained by an operation expressed by a formula obtained by replacing part or all of the terms of x−e with an inverse element and then multiplying part or all of the terms by a constant may be used as y, or a value which is obtained by an operation expressed by a formula obtained by adding a constant term to x−e may be used as y. The function value $e=f(P(s_0), \ldots, P(s_{N-1}))$ is a function value of function values $P(s_0), \ldots, P(s_{N-1}) \in F^m$. $f: F^{m \times n} \to F^m$ is a linear function that maps elements of n sets $F^m$ to elements of one set $F^m$. For instance, $e=f(P(s_0), \ldots, P(s_{N-1}))=\Sigma_{0 \leq i < N} P(s_i)=P(s_0)+ \ldots + P(s_{N-1}) \in F^m$ holds. However, this does not limit the present invention. For example, a value which is obtained by an operation expressed by a formula obtained by multiplying part or all of the terms of $P(s_0)+ \ldots + P(s_{N-1})$ by a constant may be used as e, a value which is obtained by an operation expressed by a formula obtained by replacing part or all of the terms of $P(s_0)+ \ldots + P(s_{N-1})$ with an inverse element may be used as e, a value which is obtained by an operation expressed by a formula obtained by replacing part or all of the terms of $P(s_0)+ \ldots + P(s_{N-1})$ with an inverse element and then multiplying part or all of the terms by a constant may be used as e, or a value which is obtained by an operation expressed by a formula obtained by adding a constant term to $P(s_0)+ \ldots + P(s_{N-1})$ may be used as e (Step S112).

The function value $y \in F^m$ is input to the division unit 113. The division unit 113 divides the function value y into N members $y_0, \ldots, y_{N-1}$ and outputs the members $y_0, \ldots, y_{N-1}$. It is to be noted that, for i=0, ..., N−1, $y_i \in F^{m(i)}$ holds, m(i) is an integer greater than or equal to 0 (for example, m(i) is an integer greater than or equal to 1), $m \geq N$ holds, and $m=m(0)+ \ldots +m(N-1)$ is satisfied. For instance, it is also possible to make $m(0)= \ldots =m(N-1)=m/N$ hold if in is a multiple of N. However, irrespective of whether or not in is a multiple of N, all of m(0), ..., m(N−1) may not be identical with one another. For example, at least part of m(0), ..., m(N−1) may be 0. It is to be noted that $\gamma \in F^0$ represents a null value. If m(i)=0, $y_i \in F^{m(i)}$ is a null value. The function value y is expressed by members $y_0 \in F^{m(0)}, \ldots, y_{N-1} \in F^{m(N-1)}$ (for example, a sequence of $y_0, \ldots, y_{N-1}$). For instance, the function value y is expressed as a sequence $y_0| \ldots |y_{N-1}$ obtained by arranging $y_0 \in F^{m(0)}, \ldots, y_{N-1} \in F^{m(N-1)}$. If m=1, only one of m(0), ..., m(N−1) is 1 and the others are 0. In this case, the division unit 113 does not have to divide the function value y, and outputs any one of the members $y_0, \ldots, y_{N-1}$ as the function value y and all of the other members as null values (Step S113).

The members $y_0, \ldots, y_{N-1}$ output from the division unit 113 and the seeds $s_0, \ldots, s_{N-1}$ output from the seed generation unit 111 are input to the share generation unit 116. The share generation unit 116 assigns a member $y_i$ and N−1 seeds $s_d$, where $d \in \{0, \ldots, N-1\}$ and $d \neq i$, to each share converting device 12-$A_i$ (i=0, ..., N−1), and obtains information containing the member $y_i$ and the N−1 seeds $s_d$, where $d \in \{0, \ldots, N-1\}$ and $d \neq i$, as a share $SS_i$ of the plaintext x in secret sharing and outputs the share $SS_i$. It is to be noted that, if $i \neq 0$ and $i \neq N-1$, the N−1 seeds $s_d$, where $d \in \{0, \ldots, N-1\}$ and $d \neq i$, are seeds $s_0, \ldots, s_{i-1}, s_{i+i}, \ldots, s_{N-1}$. If i=0, the N−1 seeds $s_d$, where $d \in \{0, \ldots, N-1\}$ and $d \neq i$, are seeds $s_1, \ldots, s_{N-1}$. If i=N−1, the N−1 seeds $s_d$, where $d \in \{0, \ldots, N-1\}$ and $d \neq i$, are seeds $s_0, \ldots, s_{N-2}$. Each share $SS_i$ is a share of each share converting device 12-$A_i$ (i=0, ..., N−1). Each share $SS_i$ may contain other information, but does not contain a member $y_d$, where $d \in \{0, \ldots, N-1\}$ and $d \neq i$, and a seed $s_i$. It is to be noted that information containing the member $y_i \in F^0$, which is a null value, and the N−1 seeds $s_d$ means information indicating that the member $y_i$ is a null value and containing the N−1 seeds $s_d$. The information containing the member $y_i \in F^0$, which is a null value, and the N−1 seeds $s_d$ contains the N−1 seeds $s_d$, but does not actually contain the member $y_i$. The size of the seeds $s_1, \ldots, s_{N-1}$ and N do not depend on m. In (2, N)-Shamir's secret sharing, the order of magnitude of the total share size that relates to the data size m of the plaintext x is O(Nm); in the present embodiment, the order of magnitude of the total share size that relates to the data size m of the plaintext x is just O(m). The size of each share is O(m/N). For example, the total amount of data of shares $SS_0, \ldots, SS_{N-1}$ is less than N times the amount of data of the plaintext x. For instance, the amount of data of each share $SS_i$ is smaller than the amount of data of the plaintext x (Step S116).

Each share $SS_i$ output from the share generation unit 116 is input to the communication unit 117. The communication unit 117 outputs each share $SS_i$ to each share converting device 12-$A_i$ (i=0, ..., N−1). Each output share $SS_i$ is transmitted to each share converting device 12-$A_i$ through the network. That is, the share $SS_0$ is transmitted to the share converting device 12-$A_0$, the share $SS_i$ is transmitted to the share converting device 12-$A_1$, ..., and the share $SS_{N-1}$ is transmitted to the share converting device 12-$A_{N-1}$ (Step S117).

<Share Conversion Method>

Figure 5:
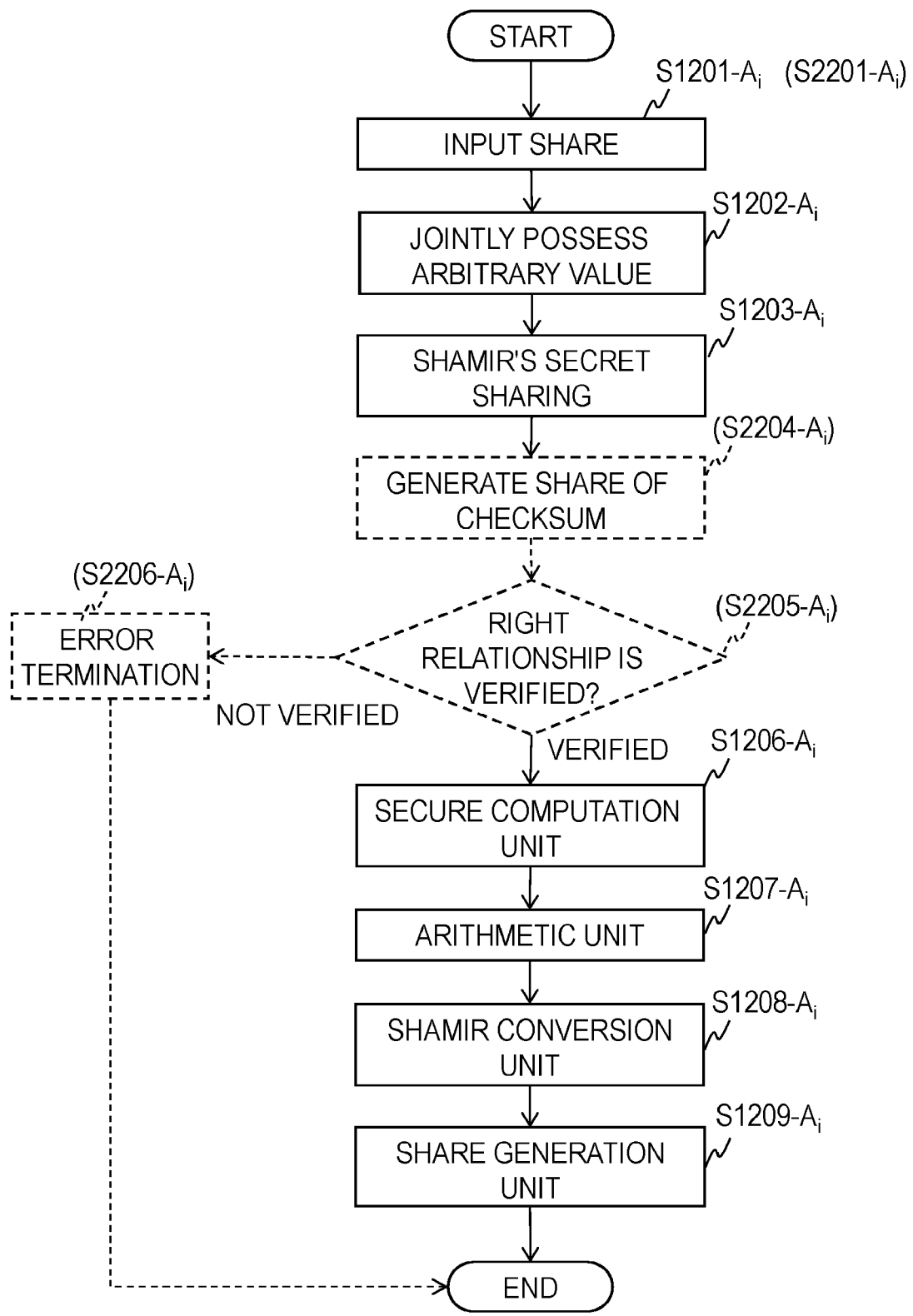
FIG. 5 is a flow diagram for explaining a share conversion method of the embodiment.

A share conversion method which is performed by each share converting device 12-$A_i$ of the present embodiment will be described using FIG. 5.

The share $SS_i$ output from the share generating device 11 and containing the member $y_i$ and the N−1 seeds $s_d$, where $d \in \{0, \ldots, N-1\}$ and $d \neq i$, is received (accepted) by the communication unit 1201-$A_i$ (a first input unit) of the share converting device 12-$A_i$ (FIG. 3). The received share $SS_i$ is stored in the storage 1210-$A_i$ (Step S1201-$A_i$).

The joint possession unit 1202-$A_i$ possesses an arbitrary value $t_i \in F^{m(i)}$ jointly with a joint possession unit 1202-$A_{i-1 \bmod N}$ of another share converting device 12-$A_{i-1 \bmod N}$. That is, the joint possession unit 1202-$A_i$ and the joint possession unit 1202-$A_{i-1 \bmod N}$ obtain the same arbitrary value $t_i$. The joint possession unit 1202-$A_i$ and the joint possession unit 1202-$A_{i-1 \bmod N}$ may jointly possess the arbitrary value $t_i$ by transmitting the arbitrary value $t_i$ or information for identification of the arbitrary value $t_i$ to the joint possession unit 1202-$A_{i-1 \bmod N}$ from the joint possession unit 1202-$A_i$, the joint possession unit 1202-$A_i$ and the joint possession unit 1202-$A_{i-1 \bmod N}$ may jointly possess the arbitrary value $t_i$ by transmitting the arbitrary value $t_i$ or information for identification of the arbitrary value $t_i$ to the joint possession unit 1202-$A_i$ from the joint possession unit 1202-$A_{i-1 \bmod N}$, or joint possession of the arbitrary value $t_i$ may be achieved as a result of the joint possession unit 1202-$A_i$ and the joint possession unit 1202-$A_{i-1 \bmod N}$ jointly possessing a common seed value and executing the same processing using the common seed value. The arbitrary value $t_i$ may be a random number (a pseudo random number or a true random number), a value obtained by other processing, or a value selected from a plurality of predetermined values. Joint possession of the arbitrary value $t_i \in F^{m(i)}$ may be performed when Step S1201-$A_i$ is executed, in response to a request from the other joint possession unit 1202-$A_{i-1 \bmod N}$, or in response to other events, or may be performed in advance. The joint possession unit 1202-$A_i$ outputs the obtained arbitrary value $t_i$. If the member $y_i$ is a null value, the arbitrary value $t_i$ is also set at a null value (Step S1202-$A_i$).

The member $y_i$ contained in the share $SS_i$ and the arbitrary value $t_i$ output from the joint possession unit 1202-$A_i$ are input to the secret sharing unit 1203-$A_i$. The secret sharing unit 1203-$A_i$ obtains a share $[y_i]_u \in F^{m(i)}$ (a Shamir share) of each share converting device 12-$A_u$ (u=0, ..., N−1) by secret-sharing the member $y_i$ in accordance with Shamir's secret sharing scheme and outputs the share $[y_i]_u$. It is to be noted that the arbitrary value $t_i$ is assumed to be a share $[y_i]_{i-1 \bmod N}$ of the share converting device 12-$A_{i-1 \bmod N}$. Shamir's secret sharing scheme of the embodiment is a 2-out-of-N threshold sharing scheme, in which, given any two different shares, plaintext can be reconstructed; however, given any one piece of share information, information on the plaintext cannot be obtained at all. In the 2-out-of-N threshold sharing scheme, if the secret-shared member $y_i$ and one share $[y_i]_{i-1 \bmod N} = t_i$ are determined, another share can be obtained. For instance, on the assumption that the arbitrary value $t_i$ is the share $[y_i]_{i-1 \bmod N}$ of the share converting device 12-$A_{i-1 \bmod N}$, the secret sharing unit 1203-$A_i$ identifies an equation (for example, identifies a coefficient of each term of the equation) which holds between the member $y_i$, the share $[y_i]_{i-1 \bmod N} = t_i$, and another share $[y_i]_{u'} \in F^{m(i)}$ (u' $\in \{0, \ldots, N-1\}$ and u'$\neq$i−1 mod N) using Lagrange's interpolation formula and generates the other share $[y_i]_{u'} \in F^{m(i)}$ by solving the equation. The communication unit 1201-$A_i$ (a first output unit) outputs (transmits) shares $[y_i]_d$ obtained in the secret sharing unit 1203-$A_i$ to the other N−1 share converting devices 12-$A_d$ (d $\in \{0, \ldots, N-1\}$ and d$\neq$i). Since the share converting device 12-$A_i$ and the share converting device 12-$A_{i-1 \bmod N}$ already jointly possess the share $[y_i]_{i-1 \bmod N} = t_i$ (Step S1202-$A_i$), further transmission of the share $[y_i]_{i-1 \bmod N} = t_i$ to the share converting device 12-$A_{i-1 \bmod N}$ may be omitted. If the member $y_i$ is a null value, the share $[y_i]_u$ is also set at a null value. The communication unit 1201-$A_i$ (a second input unit) receives (accepts) shares $[y_d]_i$ output (transmitted) from the other share converting devices 12-$A_d$ in a similar manner (Step S1203-$A_i$).

The share $[y_i]_i$ of the share converting device 12-$A_i$, which has been output from the secret sharing unit 1203-$A_i$, and the shares $[y_d]_i$ transmitted from the other share converting devices 12-$A_d$ (d$\in\{0, \ldots, N-1\}$ and d$\neq$i) are input to the secure computation unit 1206-$A_i$ (a first secure computation unit). The secure computation unit 1206-$A_i$ obtains a share $[y]_i \in F^m$ by joining (concatenating) shares $[y_0]_i, \ldots, [y_{N-1}]_i$ to one another by publicly known secure computation and outputs the share $[y]_i$. The share $[y]_i$ is a share of the function value y in accordance with Shamir's secret sharing scheme. The function value y is what is obtained by joining the N members $y_0, \ldots, y_{N-1}$. For example, a sequence $y_0 | \ldots | y_{N-1}$ obtained by arranging $y_0 \in F^{m(0)}, \ldots, y_{N-1} \in F^{m(N-1)}$ is y. To obtain the share $[y]_i \in F^m$ by joining the shares $[y_0]_i, \ldots, [y_{N-1}]_i$ in accordance with Shamir's secret sharing scheme by secure computation, it is only necessary to use, for instance, a sequence of the shares $[y_0]_i, \ldots, [y_{N-1}]_i$ as a share [y]. That is, the share [y] is expressed by shares $[y_0]_i \in F^{m(0)}, \ldots, [y_{N-1}]_i \in F^{m(N-1)}$. For example, a sequence $[y_0]_i | \ldots | [y_{N-1}]_i$ obtained by arranging the shares $[y_0]_i, \ldots, [y_{N-1}]_i$ is the share [y] (Step S1206-$A_i$).

The N−1 seeds $s_d$ contained in the share $SS_i$ are input to the arithmetic unit 1207-$A_i$. The arithmetic unit 1207-$A_i$ obtains N−1 function values $P(s_d) \in F^m$ (for example, pseudo random numbers) of the N−1 seeds $s_d$ and outputs the N−1 function values $P(s_d)$ ($d \in \{0, \ldots, N-1\}$ and $d \neq i$). The function P which is used for this operation is the same as the function P for obtaining the function value y in the arithmetic unit 112 of the share generating device 11. A set $SET_i$ of the N−1 function values $P(s_d)$, where $d \in \{0, \ldots, N-1\}$ and $d \neq i$ (that is, the set $SET_i$ has the N−1 function values $P(s_d)$, where $d \in \{0, \ldots, N-1\}$ and $d \neq i$, as members thereof), is a share of the function value $e = f(P(s_0), \ldots, P(s_{N-1})) \in F^m$ with respect to function values $P(s_0), \ldots, P(s_{N-1})$ of the N seeds $s_0, \ldots, s_{N-1}$. That is, if there are at least two different sets, sets $SET_{i'}$ and $SET_{i''}$ ($i', i'' \in \{0, \ldots, N-1\}$ and $i' \neq i''$), the function value $e = f(P(s_0), \ldots, P(s_{N-1}))$ can be reconstructed. In other words, the set $SET_i$ is a (2, N)-replication secret sharing share of the function value e (Step S1207-$A_i$).

The set $SET_i$ of the N−1 function values $P(s_d)$, where $d \in \{0, \ldots, N-1\}$ and $d \neq i$, is input to the Shamir conversion unit 1208-$A_i$. The Shamir conversion unit 1208-$A_i$ converts the set $SET_i$, which is the (2, N)-replication secret sharing share of the function value e, into a share $[e]_i$ of the function value e in accordance with Shamir's secret sharing scheme by a publicly known Shamir conversion method and outputs the share $[e]_i$. Examples of a method of converting a (2, N)-replication secret sharing share into a share in accordance with Shamir's secret sharing scheme include a method described in "Ronald Cramer, Ivan Damgard, Yuval Ishai: Share Conversion, Pseudorandom Secret-Sharing and Applications to Secure Computation. TCC 2005: 342-362" (Reference Literature 1) (Step S1208-$A_i$).

The share $[y]_i$ output from the secure computation unit 1206-$A_i$ and the share $[e]_i$ output from the Shamir conversion unit 1208-$A_i$ are input to the share generation unit 1209-$A_i$ (a first share generation unit). As described earlier, the share $[y]_i$ is a share of the function value $y = g(x, e) \in F^m$ with respect to the plaintext x and the function value e in accordance with Shamir's secret sharing scheme. Here, a function that satisfies $x = g^{-1}(y, e) \in F^m$ with respect to $y = g(x, e)$ is defined as $g^{-1}: F^{m \times 2} \to F^m$. For example, if y=x−e, x=y+e holds. The share generation unit 1209-$A_i$ obtains a share $[x]_i \in F^m$ of $x = g^{-1}(y, e)$ in accordance with Shamir's secret sharing scheme by secure computation using the share $[y]_i$ and the share $[e]_i$ and outputs the share $[x]_i$. For instance, if x=y+e, the share generation unit 1209-$A_i$ obtains a share $[y+e]_i$ by secure computation using the share $[y]_i$ and the share $[e]_i$ and outputs the share $[y+e]_i$. Secure computation using shares in accordance with Shamir's secret sharing scheme is described in, for example, "Michael Ben-Or, Shafi Goldwasser, Avi Wigderson: Completeness Theorems for Non-Cryptographic Fault-Tolerant Distributed Computation (Extended Abstract). STOC 1988: 1-10" (Reference Literature 2) (Step S1209-$A_i$).

Features of the Present Embodiment

The share generating device 11 outputs information containing the member $y_i \in F^{m(i)}$ and the N−1 seeds $s_d$, where $d \in \{0, \ldots, N-1\}$ and $d \neq i$, to each share converting device 12-$A_i$ as the share $SS_i$. This makes it possible to make the total amount of communication data smaller than that of shares in accordance with Shamir's secret sharing scheme. Each share converting device 12-$A_i$ can convert the share $SS_i$ into the share $[x]_i$ in accordance with Shamir's secret sharing scheme. This makes it possible to perform secure computation.

Second Embodiment

A second embodiment is a modification of the first embodiment. In the present embodiment, a checksum corresponding to a share is generated at the time of generation of a share and the share is verified using the checksum at the time of share conversion. In the following description, an explanation of a matter that has already been described in the first embodiment is sometimes simplified, using the same reference character as that of the first embodiment.

<Configuration>

As illustrated in FIG. 1, a secure computation system 2 of the present embodiment includes a share generating device 21 and N share converting devices 22-$A_0, \ldots, 22-A_{N-1}$, and these devices can communicate with one another through a network such as the Internet. Although FIG. 1 illustrates one share generating device 21, the secure computation system 2 may include a plurality of share generating devices.

As illustrated in FIG. 2, the share generating device 21 of the present embodiment includes a seed generation unit 111, an arithmetic unit 112, a division unit 113, an arbitrary value generation unit 214, a checksum generation unit 215, a share generation unit 216, a communication unit 117, a storage 118, and a control unit 119 and executes each processing under control of the control unit 119. Information output from each processing unit is stored in the storage 118 and is read therefrom when necessary and input to another processing unit.

As illustrated in FIG. 3, each share converting device 22-$A_i$ (i=0, ..., N−1) includes a communication unit 1201-$A_i$, a joint possession unit 1202-$A_i$, a secret sharing unit 1203-$A_i$, a share generation unit 2204-$A_i$, a verification unit 2205-$A_i$, a secure computation unit 1206-$A_i$, an arithmetic unit 1207-$A_i$, a Shamir conversion unit 1208-$A_i$, a share generation unit 1209-$A_i$, a storage 1210-$A_i$, and a control unit 1211-$A_i$ and executes each processing under control of the control unit 1211-$A_i$. Information output from each processing unit is stored in the storage 1210-$A_i$ and is read therefrom when necessary and input to another processing unit.

<Share Generation Method>

A share generation method which is performed by the share generating device 21 will be described using FIG. 4. First, in place of the share generating device 11, the share generating device 21 executes the processing from Steps S111 to S113 described in the first embodiment.

Next, the arbitrary value generation unit 214 obtains N arbitrary values $r_0, \ldots, r_{N-1} \in F^v$ belonging to a set $F^v$ and outputs the arbitrary values $r_0, \ldots, r_{N-1}$. It is to be noted that v is an integer greater than or equal to 1. A greater data amount reduction effect can be achieved if v is less than or equal to m (for instance, v is less than m). For example, v=1 holds. One example of the set $F^v$ is an extension field whose basic field is a field F and whose degree of a field extension is v. The "arbitrary value" may be a random number (a pseudo random number or a true random number) or a value selected from a plurality of preset values. For instance, the arbitrary value generation unit 214 generates N random numbers and outputs them as the arbitrary values $r_0, \ldots, r_{N-1}$ (Step S214).

The members $y_0, \ldots, y_{N-1}$ output from the division unit 113 and the arbitrary values $r_0, \ldots, r_{N-1}$ output from the arbitrary value generation unit 214 are input to the checksum generation unit 215. Here, each member $y_i \in F^{m(i)}$ can be divided into m(i) sub-members $(y_i)_0, \ldots, (y_i)_{m(i)-1} \in F$. For example, each member $y_i$ is expressed as a sequence $(y_i)_0 | \ldots | (y_i)_{m(i)-1}$ obtained by arranging the sub-members $(y_i)_0, \ldots, (y_i)_{m(i)-1}$. Moreover, m'(i) is ceil(m(i)/v) and $(y'_i)_j$ is $((y_i)_{vj}, (y_i)_{vj+1}, \ldots, (y_i)_{v(j+1)-1}) \in F^v$ belonging to the set $F^v$. It is to be noted that ceil is a ceiling function and m'(i) is ceil(m(i)/v) (that is, m'(i) is the smallest integer which is greater than or equal to m(i)/v). Furthermore, for j=m'(i)-1, if the number of $(y'_i)_{v(m'(i)-1)}, (y_i)_{v(m'(i)-1)+1}, \ldots, (y_i)_{vm'(i)-1}$ is less than v, it is assumed that $(y'_i)_{m'(i)-1}=((y_i)_{v(m'(i)-1)}, (y_i)_{v(m'(i)-1)+1}, \ldots, (y_i)_{m(i)-1}, 0, \ldots, 0) \in F^v$ holds. The checksum generation unit 215 obtains a checksum $c_i = \Sigma_{0 \leq j < m'(i)-1}\{(y'_i)_j r_i^{j+1}\} + (y'_i)_{m'(i)-1} r_i^{m'(i)+1} \in F^v$ corresponding to each share $SS_i$ using the members $y_0, \ldots, y_{N-1}$ and the arbitrary values $r_0, \ldots, r_{N-1}$ and outputs the checksum $c_i$ (Step S215).

The members $y_0, \ldots, y_{N-1}$ output from the division unit 113, the seeds $s_0, \ldots, s_{N-1}$ output from the seed generation unit 111, the arbitrary values $r_0, \ldots, r_{N-1}$ output from the arbitrary value generation unit 214, and the checksums $c_0, \ldots, c_{N-1}$ output from the checksum generation unit 215 are input to the share generation unit 216. The share generation unit 216 assigns a member $y_i$, N-1 seeds $s_d$, where $d \in \{0, \ldots, N-1\}$ and $d \neq i$, N-1 arbitrary values $r_d$, where $d \in \{0, \ldots, N-1\}$ and $d \neq i$, and a checksum $c_{i-1 \mod N}$ to each share converting device 22-$A_i$ (i=0, ..., N-1), and obtains information containing the member $y_i$, the N-1 seeds $s_d$, where $d \in \{0, \ldots, N-1\}$ and $d \neq i$, the N-1 arbitrary values $r_d$, where $d \in \{0, \ldots, N-1\}$ and $d \neq i$, and the checksum $c_{i-1 \mod N}$ as a share $SS_i$ of the plaintext x in secret sharing and outputs the share $SS_i$. Each share $SS_i$ is a share of each share converting device 22-$A_i$ (i=0, ..., N-1). Each share $SS_i$ may contain other information, but does not contain a member $y_d$, where $d \in \{0, \ldots, N-1\}$ and $d \neq i$, a seed $s_i$, an arbitrary value $r_i$, and checksums of $c_0, \ldots, c_{N-1}$ other than $c_{i-1 \mod N}$. The size of the seeds $s_1, \ldots, s_{N-1}$, N, and v do not depend on m. In (2, N)-Shamir's secret sharing, the order of magnitude of the total share size that relates to the data size m of the plaintext x is O(Nm); in the present embodiment, the order of magnitude of the total share size that relates to the data size m of the plaintext x is just O(m). The size of each share is O(m/N). For example, the total amount of data of shares $SS_0, \ldots, SS_{N-1}$ is less than N times the amount of data of the plaintext x. For instance, the amount of data of each share $SS_i$ is smaller than the amount of data of the plaintext x (Step S216).

Each share $SS_i$ obtained in the share generation unit 216 is input to the communication unit 117. The communication unit 117 outputs each share $SS_i$ to each share converting device 22-$A_i$ (i=0, ..., N-1). Each output share $SS_i$ is transmitted to each share converting device 22-$A_i$ through the network. That is, the share $SS_0$ is transmitted to the share converting device 22-$A_0$, the share $SS_1$ is transmitted to the share converting device 22-$A_1$, ..., and the share $SS_{N-1}$ is transmitted to the share converting device 22-$A_{N-1}$ (Step S217).

<Share Conversion Method>

A share generation method which is performed by each share converting device 22-$A_i$ of the present embodiment will be described using FIG. 5.

The share $SS_i$ output from the share generating device 21 and containing the member $y_i$, the N-1 seeds $s_d$, where $d \in \{0, \ldots, N-1\}$ and $d \neq i$, the N-1 arbitrary values $r_d$, where $d \in \{0, \ldots, N-1\}$ and $d \neq i$, and the checksum $c_{i-1 \mod N}$ is received (accepted) by the communication unit 1201-$A_i$ (the first input unit) of the share converting device 22-$A_i$ (FIG. 3). The received share $SS_i$ is stored in the storage 1210-$A_i$ (Step S2201-$A_i$).

Next, in place of each share converting device 12-$A_i$, each share converting device 22-$A_i$ executes the processing in Steps S1202-$A_i$ and S1203-$A_i$ described in the first embodiment.

The arbitrary values $r_d$ contained in the share $SS_i$ and the shares $[y_d]_i$ ($d \in \{0, \ldots, N-1\}$ and $d \neq i$) received by the communication unit 1201-$A_i$ (Step S1203-$A_i$) are input to the share generation unit 2204-$A_i$ (a second share generation unit). The share generation unit 2204-$A_i$ obtains a share $[c_d]_i$ of a checksum $c_d = \Sigma_{0 \leq j < m'(d)-1}\{(y'_d)_j r_d^{j+1}\} + (y'_d)_{m'(d)-1} r_d^{m'(d)+1} \in F^v$ in accordance with Shamir's secret sharing scheme by secure computation (public value multiplication and addition by secure computation) using the arbitrary values $r_d$ and the shares $[y_d]_i$ and outputs the share $[c_d]_i$. As described earlier, the member $y_d$ can be divided into m(d) sub-members $(y_d)_0, \ldots, (y_i)_{m(d)-1}$. $(y'_d)_j$ is $((y_d)_{vj}, (y_d)_{vj+1}, \ldots, (y_d)_{v(j+1)-1}) \in F^v$ belonging to the set $F^v$, and m'(d) is ceil(m(d)/v). Moreover, for j=m'(i)-1, if the number of $(y_d)_{v(m'(d)-1)}, (y_d)_{v(m'(d)-1)+1}, \ldots, (y_d)_{vm'(d)-1}$ is less than v, it is assumed that $(y'_d)_{m'(d)-1}=((y_d)_{v(m'(d)-1)}, (y_d)_{v(m'(d)-1)+1}, \ldots, (y_d)_{m(d)-1}, 0, \ldots, 0) \in F^v$. A method of performing public value multiplication and addition by secure computation using shares in accordance with Shamir's secret sharing scheme is described in, for example, Reference Literature 2 (Lemma on page 3) (Step S2204-$A_i$).

The share $[c_d]_i$ is input to the communication unit 1201-$A_i$. The communication unit 1201-$A_i$ (a second output unit) outputs the share $[c_d]_i$ ($d \in \{0, \ldots, N-1\}$ and $d \neq i$) to another share converting device 22-$A_{d+1 \mod N}$. The output share $[c_d]_i$ is transmitted to the share converting device 22-$A_{d+1 \mod N}$ via the network, received by a communication unit 1201-$A_{d+1 \mod N}$ of the share converting device 22-$A_{d+1 \mod N}$, and stored in a storage 1210-$A_{d+1 \mod N}$. The share $[c_d]_i$, a share $[c_d]_{d+1 \mod N}$ generated by a share generation unit 2204-$A_{d+1 \mod N}$, and the checksum $c_d$ contained in a share $SS_{d+1 \mod N}$ are input to a verification unit 2205-$A_{d+1 \mod N}$. The verification unit 2205-$A_{d+1 \mod N}$ verifies whether the checksum $c_d$ and the share $[c_d]_i$ have a right relationship. The verification unit 2205-$A_{d+1 \mod N}$ of the present embodiment verifies whether the checksum $c_d$ and N shares $[c_d]_0, \ldots, [c_d]_{N-1}$ have a right relationship. For instance, the verification unit 2205-$A_{d+1 \mod N}$ verifies whether or not there is consistency among the input N shares $[c_d]_0, \ldots, [c_d]_{N-1}$ (Verification 1: consistency verification) and verifies whether a value reconstructed from any two shares and $[c_d]_{i'}$ and $[c_d]_{i''}$ (i', i'' $\in \{0, \ldots, N-1\}$ and i'$\neq$i'') of the input N shares $[c_d]_0, \ldots, [c_d]_{N-1}$ (Shamir's secret sharing scheme of the embodiment is a 2-out-of-N threshold sharing scheme) and the checksum $c_d$ are identical with each other (Verification 2: identicalness verification). Consistency verification is, for example, calculating another share $[c_d]_{i'''}$ (i''' $\in \{0, \ldots, N-1\}$, i'''$\neq$i'', and i'''$\neq$i') from any two shares $[c_d]_{i'}$ and $[c_d]_{i''}$ using Lagrange's interpolation formula and, by using the result of calculation as $[b_d]_{i'''}$, verifying whether $[b_d]_{i'''}$ and $[c_d]_{i'''}$ in the N shares $[c_d]_0, \ldots, [c_d]_{N-1}$ input to the verification unit 2205-$A_{d+1 \text{ mod } N}$ are identical with each other. Consistency is verified by consistency verification if $[b_d]_{i'''} = [c_d]_{i'''}$ holds for all i''', otherwise consistency is not verified by consistency verification. Moreover, in identicalness verification, identicalness is verified by identicalness verification if the value reconstructed from the two shares $[c_d]_{i'}$ and $[c_d]_{i''}$ and the checksum $c_d$ are identical with each other, otherwise identicalness is not verified by identicalness verification. A right relationship is verified if consistency is verified by consistency verification and identicalness is verified by identicalness verification, otherwise a right relationship is not verified.

Likewise, a share $[c_{i-1 \text{ mod } N}]_d$ output from another share converting device 22-$A_d$ is received (accepted) by the communication unit 1201-$A_i$ (the second input unit) and stored in the storage 1210-$A_i$. The share $[c_{i-1 \text{ mod } N}]_d$ output from the other share converting device 22-$A_d$, a share $[c_{i-1 \text{ mod } N}]_i$ generated by the share generation unit 2204-$A_i$, and the checksum $c_{i-1 \text{ mod } N}$ contained in the share $SS_i$ are input to the verification unit 2205-$A_i$. The verification unit 2205-$A_i$ verifies whether the checksum $c_{i-1 \text{ mod } N}$ and the share $[c_{i-1 \text{ mod } N}]_d$ have a right relationship. The verification unit 2205-$A_i$ of the present embodiment verifies whether the input checksum $c_{i-1 \text{ mod } N}$, share $[c_{i-1 \text{ mod } N}]_d$, and share $[c_{i-1 \text{ mod } N}]_i$ have a right relationship. For example, the verification unit 2205-$A_i$ verifies whether or not there is consistency among the input N shares $[c_{i-1 \text{ mod } N}]_0, \ldots, [c_{i-1 \text{ mod } N}]_{N-1}$ (Verification 1: consistency verification) and verifies whether a value reconstructed from any two shares $[c_{i-1 \text{ mod } N}]_{i'}$ and $[c_{i-1 \text{ mod } N}]_{i''}$ (i', i'' $\in \{0, \ldots, N-1\}$ and i'$\neq$i'') of the input N shares $[c_{i-1 \text{ mod } N}]_0, \ldots, [c_{i-1 \text{ mod } N}]_{N-1}$ is identical with the checksum $c_{i-1 \text{ mod } N}$ (Verification 2: identicalness verification). Consistency verification is, for example, calculating another share $[c_{i-1 \text{ mod } N}]_{i'''}$ (i''' $\in \{0, \ldots, N-1\}$, i'''$\neq$i'', and i'''$\neq$i') from any two shares $[c_{i-1 \text{ mod } N}]_{i'}$ and $[c_{i-1 \text{ mod } N}]_{i''}$ using Lagrange's interpolation formula and, by using the result of calculation as $[b_{i-1 \text{ mod } N}]_{i'''}$, verifying whether $[b_{i-1 \text{ mod } N}]_{i'''}$ and $[c_{i-1 \text{ mod } N}]_{i'''}$ in the N shares $[c_{i-1 \text{ mod } N}]_0, \ldots, [c_{i-1 \text{ mod } N}]_{N-1}$ input to the verification unit 2205-$A_i$ are identical with each other. Consistency is verified by consistency verification if $[b_{i-1 \text{ mod } N}]_{i'''} = [c_{i-1 \text{ mod } N}]_{i'''}$ holds for all i''', otherwise consistency is not verified by consistency verification. Moreover, in identicalness verification, identicalness is verified by identicalness verification if the value reconstructed from the two shares $[c_{i-1 \text{ mod } N}]_{i'}$ and $[c_{i-1 \text{ mod } N}]_{i''}$ and the checksum $c_{i-1 \text{ mod } N}$ are identical with each other, otherwise identicalness is not verified by identicalness verification. A right relationship is verified if consistency is verified by consistency verification and identicalness is verified by identicalness verification, otherwise a right relationship is not verified (Step S2205-$A_i$).

If the verification unit 2205-$A_i$ determines that a right relationship is verified, in place of each share converting device 12-$A_i$, each share converting device 22-$A_i$ executes the processing from Steps S1206-$A_i$ to S1209-$A_i$ described in the first embodiment and ends the processing. On the other hand, if the verification unit 2205-$A_i$ determines that a right relationship is not verified, the control unit 1211-$A_i$ makes the processing terminate with an error message (Step S2206-$A_i$).

Features of the Present Embodiment

Also in the present embodiment, it is possible to make the total amount of communication data smaller than that of shares in accordance with Shamir's secret sharing scheme. Moreover, each share converting device 22-$A_i$ can convert the share $SS_i$ into the share $[x]_i$ in accordance with Shamir's secret sharing scheme. Furthermore, in the present embodiment, since the share $SS_i$ contains a checksum and verification processing is performed at the time of share conversion, it is possible to detect unauthorized processing performed in the share generating device 21 and/or the share converting device 22-$A_i$.

It is to be noted that the present invention is not limited to the foregoing embodiments. For example, the above-described various kinds of processing may be executed, in addition to being executed in chronological order in accordance with the descriptions, in parallel or individually depending on the processing power of a device that executes the processing or when necessary. In addition, it goes without saying that changes may be made as appropriate without departing from the spirit of the present invention. Moreover, the share generating device and/or the share converting device may be part of a secure computation device that performs secure computation or may be a device that is different from the secure computation device.

The above-described each device is embodied by execution of a predetermined program by a general- or special-purpose computer having a processor (hardware processor) such as a central processing unit (CPU), memories such as random-access memory (RAM) and read-only memory (ROM), and the like, for example. The computer may have one processor and one memory or have multiple processors and memories. The program may be installed on the computer or pre-recorded on the ROM and the like. Also, some or all of the processing units may be embodied using an electronic circuit that implements processing functions without using programs, rather than an electronic circuit (circuitry) that implements functional components by loading of programs like a CPU. An electronic circuit constituting a single device may include multiple CPUs.

When the above-described configurations are implemented by a computer, the processing details of the functions supposed to be provided in each device are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the storage device thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

Instead of executing a predetermined program on the computer to implement the processing functions of the present devices, at least some of the processing functions may be implemented by hardware.

The inventions of the "share generation method" and the "share conversion method" fall under the category of "the invention of a process for producing a product" under Article 2, paragraph (3), item (iii) of the Patent Act. Moreover, shares which are obtained by the "share generation method" and the "share conversion method" fall under the category of a "computer program, etc." under Article 2, paragraph (4) of the Patent Act. For example, a header, an extension, or the like is added to such shares for subsequent processing, and a computer that processes these shares executes processing using each share while referring to the header, the extension, or the like added to the share.

DESCRIPTION OF REFERENCE NUMERALS 1, 2 secure computation system
11, 21 share generating device
12-$A_i$, 22-$A_i$ share converting device

What is claimed is:

1. A share converting device for secure communication that is a share converting device $A_i$ included in N share converting devices $A_0, \ldots, A_{N-1}$, wherein
   N is an integer greater than or equal to 2, m is an integer greater than or equal to 1, m(i) is an integer greater than or equal to 0, i=0, ..., N−1 holds, u=0, ..., N−1 holds, P is a function, and a range of the function P belongs to a set $F^m$ whose members are sequences of m elements of field F, and
   the share converting device includes processing circuitry configured to:
     accept a share $SS_i$ containing N−1 seeds $s_d$, where $d \in \{0, \ldots, N-1\}$ and $d \neq i$, and a member $y_j \in F^{m(i)}$ belonging to a set $F^{m(j)}$, the share $SS_j$ being a share of plaintext x in secret sharing received, over a network, from a share generating device,
     possess an arbitrary value $t_i \in F^{m(i)}$ jointly with another share converting device $A_{j-1 \bmod N}$,
     obtain a share $[y_i]_u \in F^{m(i)}$ of each share converting device $A_u$ by secret-sharing the member $y_i$ in accordance with Shamir's secret sharing scheme on an assumption that the arbitrary value $t_i$ is a share $[y_j]_{j-1 \bmod N}$ of the share converting device $A_{i-1 \bmod N}$ and outputs the share $[y_i]_u$,
     accept shares $[y_d]_i$,
     obtain function values $P(s_d) \in F^m$ of the seeds $s_d$,
     convert a set $SET_i$ of the N−1 function values $P(s_d)$, where $d \in \{0, \ldots, N-1\}$ and $d \neq i$, which is a share of a function value $e = f(P(s_0), \ldots, P(s_{N-1})) \in F^m$ with respect to function values $P(s_0), \ldots, P(s_{N-1})$ of N seeds $s_0, \ldots, s_{N-1}$, into a share $[e]_j$ of the function value e in accordance with Shamir's secret sharing scheme, and
     obtain a share $[x]_i$ of $x = g^{-1}(y, e)$ in accordance with Shamir's secret sharing scheme by secure computation using a share $[y]_i$ and the share $[e]_j$, where the share $[y]_i$ which is expressed by shares $[y_0]_i, \ldots, [y_{N-1}]_i$ is a share of a function value $y = g(x, e) \in F^m$ with respect to plaintext x and the function value e,
   wherein each share $SS_j$ is a share that is transmitted respectively to each of the plurality of share converting devices $A_j$, and each share converting device $A_j$ converts each respective share $SS_j$, whose total amount of communication data is smaller than that of shares in accordance with Shamir's secret sharing scheme, into a respective share $[x]_j$ in accordance with Shamir's secret sharing scheme.

2. The share converting device according to claim 1, wherein
   v is an integer greater than or equal to 1, ceil is a ceiling function, a member $y_d$ can be divided into m(d) submembers $(y_d)_0, \ldots, (y_d)_{m(d)-1}$, m'(d) is ceil(m(d)/v), and $(y'_d)_j$ is $((y_d)_{vj}, (y_d)_{vj+1}, \ldots, (y_d)_{v(j+1)-1}) \in F^v$ belonging to a set $F^v$,
   the share $SS_i$, which is accepted by the first input unit, further contains N−1 arbitrary values $r_d \in F^v$, where $d \in \{0, \ldots, N-1\}$ and $d \neq i$, which belong to the set $F^v$ and a checksum $c_{i-1 \bmod N} \in F^v$, and
   the share converting device includes processing circuitry configured to:
     obtain a share $[c_d]_i$ of a checksum $c_d = \Sigma_{0 \leq j < m'(d)-1} \{(y'_d)_j r_d^{j+1}\} + (y'_d)_{m'(d)-1} r_d^{m'(d)+1} \in F^v$ in accordance with Shamir's secret sharing scheme by secure computation using the arbitrary values $r_d$ and the shares $[y_d]_j$,
     output the share $[c_d]_i$ to another share converting device $A_{d+1 \bmod N}$,
     accept a share $[c_{i-1 \bmod N}]_d$, and
     verify whether the checksum $c_{i-1 \bmod N}$ and the share $[c_{i-1 \bmod N}]_d$ have a right relationship.

3. The share converting device according to claim 1, wherein
   the function value e is $e = \Sigma_{0 \leq i < N} P(s_i) \in F^m$ and the function value y is $y = x - e \in F^m$.

4. A secure computation system for secure communication, wherein
   N is an integer greater than or equal to 2, m is an integer greater than or equal to 1, m(i) is an integer greater than or equal to 0, i=0, ..., N−1 holds, u=0, ..., N−1 holds, P is a function, and a range of the function P belongs to a set $F^m$ whose members are sequences of m elements of field F,
   the secure computation system includes
   a share generating device, and
   N share converting devices $A_0, \ldots, A_{N-1}$,
   the share generating device includes processing circuitry configured to:
     obtain N seeds $s_0, \ldots, s_{N-1}$,
     obtain a function value $y = g(x, e) \in F^m$ of plaintext $x \in F^m$ and a function value e, where $P(s_0), \ldots, P(s_{N-1}) \in F^m$ are function values of the seeds $s_0, \ldots, s_{N-1}$ and $e = f(P(s_0), \ldots, P(s_{N-1})) \in F^m$ is a function value of the function values $P(s_0), \ldots, P(s_{N-1}) \in F^m$, and
     obtain information containing a member $y_i \in F^{m(i)}$ and N−1 seeds $s_d$, where $d \in \{0, \ldots, N-1\}$ and $d \neq i$, as a share $SS_i$ of the plaintext x in secret sharing and outputs the share $SS_i$, where the function value y is expressed by members $y_0 \in F^{m(0)}, \ldots, y_{N-1} \in F^{m(N-1)}$ which satisfy $m = m(0) + \ldots + m(N-1)$, and a share converting device $A_i$ included in the share converting devices $A_0, \ldots, A_{N-1}$ includes processing circuitry configured to:

accept the share $SS_i$, possess an arbitrary value $t_j \in F^{m(i)}$ jointly with another share converting device $A_{i-1 \bmod N}$, obtain a share $[y_k]_u \in F^{m(i)}$ of each share converting device $A_u$ by secret-sharing the member $y_i$ in accordance with Shamir's secret sharing scheme on an assumption that the arbitrary value $t_i$ is a share $[y_i]_{i-1 \bmod N}$ of the share converting device $A_{i-1 \bmod N}$ and outputs the share $[y_i]_u$, accept shares $[y_d]_i$ output from other share converting devices $A_d$, obtain function values $P(s_d) \in F^m$ of the seeds $s_d$, a set $SET_i$ of the N−1 function values $P(s_d)$, where $d \in \{0, \ldots, N-1\}$ and $d \neq i$, which is a share of the function value $e = f(P(s_0), \ldots, P(s_{N-1})) \in F^m$ with respect to the function values $P(s_0), \ldots, P(s_{N-1})$ of the N seeds $s_0, \ldots, s_{N-1}$, into a share $[e]_i$ of the function value e in accordance with Shamir's secret sharing scheme, and obtain a share $[x]_i$ of $x = g^{-1}(y, e)$ in accordance with Shamir's secret sharing scheme by secure computation using a share $[y]_i$ and the share $[e]_i$, where the share $[y]_i$ which is expressed by shares $[y_0]_i, \ldots, [y_{N-1}]_j$ is a share of the function value $y = g(x, e) \in F^m$ with respect to the plaintext x and the function value e, wherein each share $SS_i$ is a share that is transmitted respectively to each of the plurality of share converting devices $A_i$, and each share converting device $A_i$ converts each respective share $SS_i$, whose total amount of communication data is smaller than that of shares in accordance with Shamir's secret sharing scheme, into a respective share $[x]_i$ in accordance with Shamir's secret sharing scheme.

5. A share conversion method for secure communication of a share converting device $A_i$ included in N share converting devices $A_0, \ldots, A_{N-1}$, wherein N is an integer greater than or equal to 2, m is an integer greater than or equal to 1, m(i) is an integer greater than or equal to 0, $i = 0, \ldots, N-1$ holds, $u = 0, \ldots, N-1$ holds, P is a function, and a range of the function P belongs to a set $F^m$ whose members are sequences of in elements of field F, and the share conversion method includes a first input step in which a first input unit accepts a share $SS_i$ containing N−1 seeds $s_d$, where $d \in \{0, \ldots, N-1\}$ and $d \neq i$, and a member $y_i \in F^{m(i)}$ belonging to a set $F^{m(i)}$, a joint possession step in which a joint possession unit possesses an arbitrary value $t_j \in F^{m(i)}$ jointly with another share converting device $A_{i-1 \bmod N}$, a secret sharing step in which a secret sharing unit obtains a share $[y_i]_u \in F^{m(i)}$ of each share converting device $A_u$ by secret-sharing the member $y_j$ in accordance with Shamir's secret sharing scheme on an assumption that the arbitrary value $t_i$ is a share $[y_i]_{i-1 \bmod N}$ of the share converting device $A_{i-1 \bmod N}$ and outputs the share $[y_i]_u$, a second input step in which a second input unit accepts shares $[y_d]_i$, an arithmetic step in which an arithmetic unit obtains function values $P(s_d) \in F^m$ of the seeds $s_d$, a Shamir conversion step in which a Shamir conversion unit converts a set $SET_i$ of the N−1 function values $P(s_d)$, where $d \in \{0, \ldots, N-1\}$ and $d \neq i$, which is a share of a function value $e = f(P(s_0), \ldots, P(s_{N-1})) \in F^m$ with respect to function values $P(s_0), \ldots, P(s_{N-1})$ of N seeds $s_0, \ldots, s_{N-1}$, into a share $[e]_i$ of the function value e in accordance with Shamir's secret sharing scheme, and a first share generation step in which a share $[y]_i$ which is expressed by shares $[y_0]_i, \ldots, [y_{N-1}]_i$ is a share of a function value $y = g(x, e) \in F^m$ with respect to plaintext x and the function value e, and a first share generation unit obtains a share $[x]_i$ of $x = g^{-1}(y, e)$ in accordance with Shamir's secret sharing scheme by secure computation using the share $[y]_i$ and the share $[e]_i$, wherein each share $SS_i$ is a share that is transmitted respectively to each of the plurality of share converting devices $A_i$, and each share converting device $A_i$ converts each respective share $SS_i$, whose total amount of communication data is smaller than that of shares in accordance with Shamir's secret sharing scheme, into a respective share $[x]_i$ in accordance with Shamir's secret sharing scheme.

6. A non-transitory computer-readable recording medium that stores a program for making a computer function as the share converting device according to claim 1.

* * * * *